United States Patent
Sutton et al.

(10) Patent No.: US 10,807,705 B2
(45) Date of Patent: Oct. 20, 2020

(54) ADAPTABLE ROTOR BLADE DESIGN FOR PERFORMANCE FLEXIBILITY

(71) Applicant: Bell Helicopter Textron Inc., Fort Worth, TX (US)

(72) Inventors: Drew A. Sutton, Lexington, KY (US); Mark E. Wasikowski, Keller, TX (US); Andrew Ryan Maresh, Lewisville, TX (US); Nolan B. Phillips, Bedford, TX (US)

(73) Assignee: BELL HELICOPTER TEXTRON INC., Forth Worth, TX (US)

( * ) Notice: Subject to any disclaimer, the term of this patent is extended or adjusted under 35 U.S.C. 154(b) by 663 days.

(21) Appl. No.: 15/469,463

(22) Filed: Mar. 24, 2017

(65) Prior Publication Data

US 2018/0273163 A1  Sep. 27, 2018

(51) Int. Cl.
*B64C 27/00* (2006.01)
*B64C 27/473* (2006.01)

(52) U.S. Cl.
CPC .......... *B64C 27/001* (2013.01); *B64C 27/008* (2013.01); *B64C 27/473* (2013.01); *B64C 2027/005* (2013.01); *B64C 2027/4736* (2013.01)

(58) Field of Classification Search
CPC ... B64C 27/001; B64C 27/473; B64C 27/008; B64C 2027/005; B64C 2027/4736
See application file for complete search history.

(56) References Cited

U.S. PATENT DOCUMENTS

| 2,754,917 | A | | 7/1956 | Kee | |
|---|---|---|---|---|---|
| 3,323,597 | A | * | 6/1967 | Lougobardi | B64C 27/008 416/144 |
| 3,378,766 | A | * | 4/1968 | Tobey | G01P 3/665 324/180 |
| 3,402,772 | A | | 9/1968 | Sobanik | |

(Continued)

FOREIGN PATENT DOCUMENTS

| EP | 3378766 A1 | 9/2018 |
|---|---|---|
| EP | 3378766 B1 | 11/2019 |

OTHER PUBLICATIONS

EPO Search Report issued in EP Application 17186003.4 dated Feb. 23, 2018, 4 pages.

(Continued)

*Primary Examiner* — Charles G Freay
*Assistant Examiner* — Lilya Pekarskaya
(74) *Attorney, Agent, or Firm* — Patent Capital Group

(57) ABSTRACT

In one embodiment, a rotor blade may comprise a blade body, a spar structure, and a blade nose. The blade body may comprise a skin, wherein the skin is configured to form an airfoil shape, and wherein the airfoil shape comprises an inboard end, an outboard end, a leading edge, and a trailing edge. The spar structure may comprise a first spar cap and a second spar cap, wherein the first spar cap is coupled to an upper portion of the skin, and wherein the second spar cap is coupled to a lower portion of the skin. The blade nose may comprise a cavity, wherein the cavity is configured to house a plurality of modular weights at a plurality of radial blade locations, wherein the plurality of radial blade locations comprises a range of locations between the inboard end and the outboard end.

15 Claims, 6 Drawing Sheets

(56) References Cited

U.S. PATENT DOCUMENTS

| | | | | | |
|---|---|---|---|---|---|
| 3,552,881 | A | * | 1/1971 | Rogers et al. | B64C 27/473 416/145 |
| 4,150,920 | A | * | 4/1979 | Belko | B64C 27/473 416/145 |
| 4,306,837 | A | * | 12/1981 | Brogdon | B64C 27/82 416/134 A |
| 5,137,228 | A | * | 8/1992 | Vaughen | B64C 27/46 244/123.8 |
| 5,346,367 | A | * | 9/1994 | Doolin | B29D 99/0025 156/213 |
| 5,462,409 | A | * | 10/1995 | Frengley | B64C 27/46 416/144 |
| 5,621,967 | A | * | 4/1997 | Frengley | B64C 27/46 29/889.6 |
| 6,024,325 | A | * | 2/2000 | Carter, Jr. | B64C 27/46 244/17.25 |
| 2008/0206064 | A1 | * | 8/2008 | Rochegude | B64C 27/473 416/241 R |
| 2008/0226459 | A1 | * | 9/2008 | Enenkl | B64C 27/473 416/226 |
| 2012/0301299 | A1 | * | 11/2012 | Sherrill | B64C 27/473 416/144 |
| 2014/0271215 | A1 | * | 9/2014 | Measom | B23P 15/04 416/224 |
| 2016/0169195 | A1 | * | 6/2016 | Johnson | F03D 1/0683 416/204 R |

OTHER PUBLICATIONS

EPO Official Action issued in EP Application 17186003.4 dated Aug. 8, 2018, 5 pages.
EPO Examination Report mailed in EP Application No. 17186003.4 dated Feb. 8, 2019, 4 pages.
EPO Official Action issued in EP Application 17186003.4 dated Mar. 6, 2018, 6 pages.

* cited by examiner

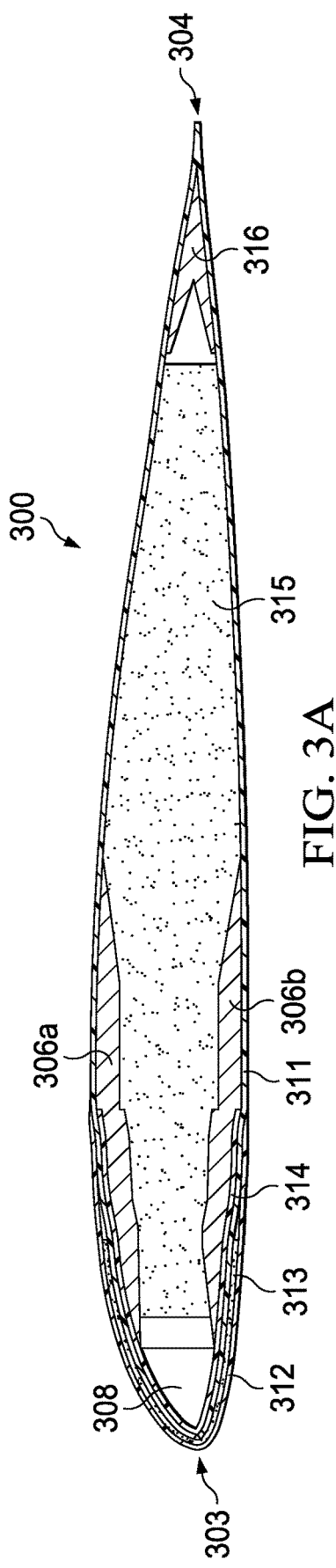
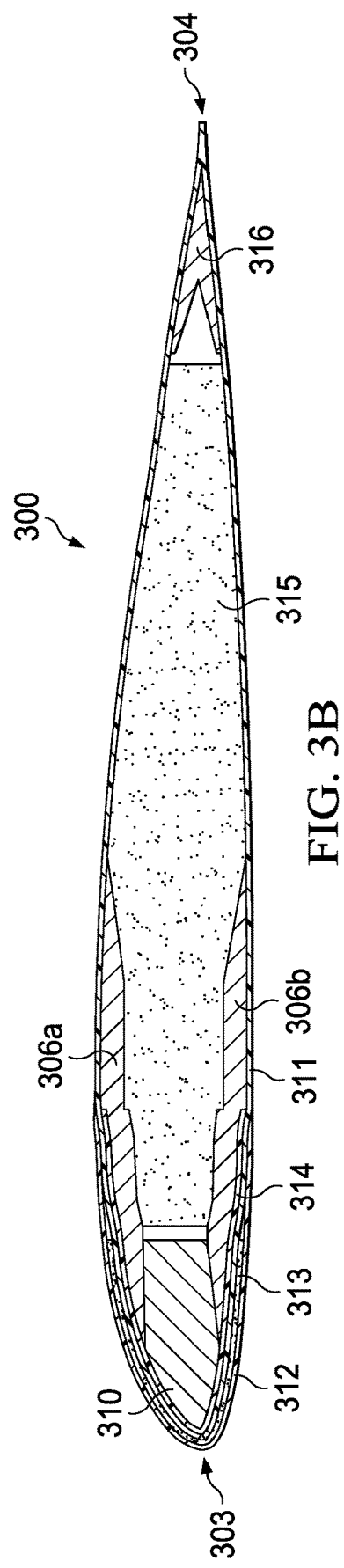
FIG. 3A
FIG. 3B

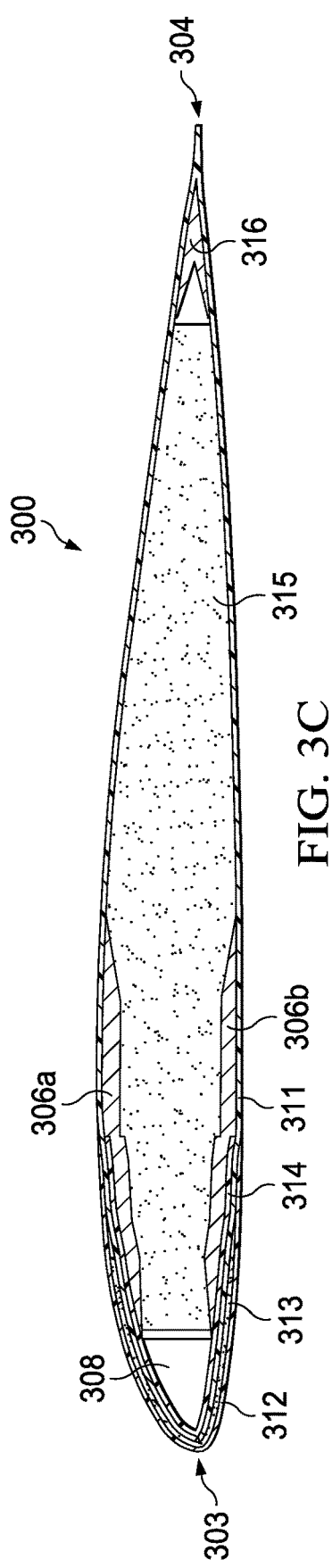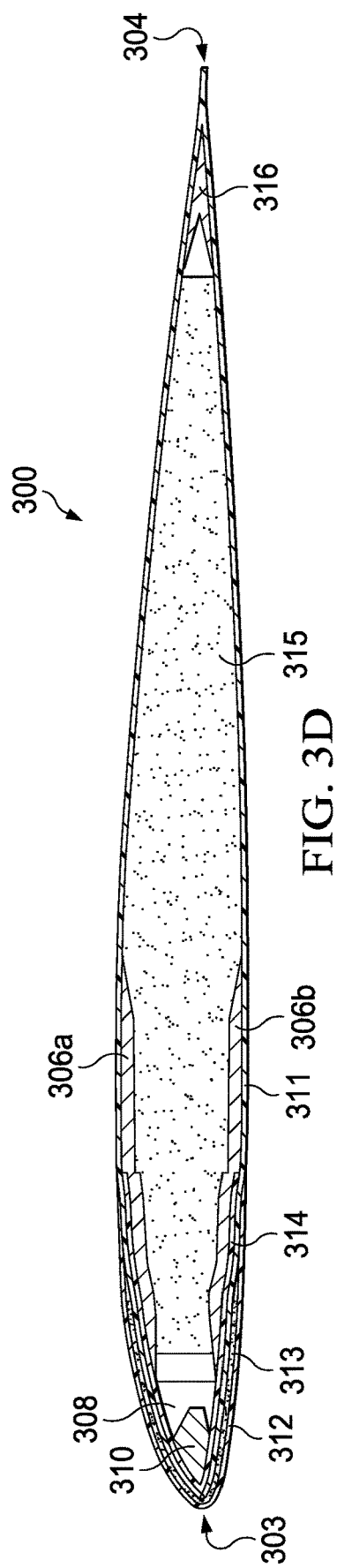

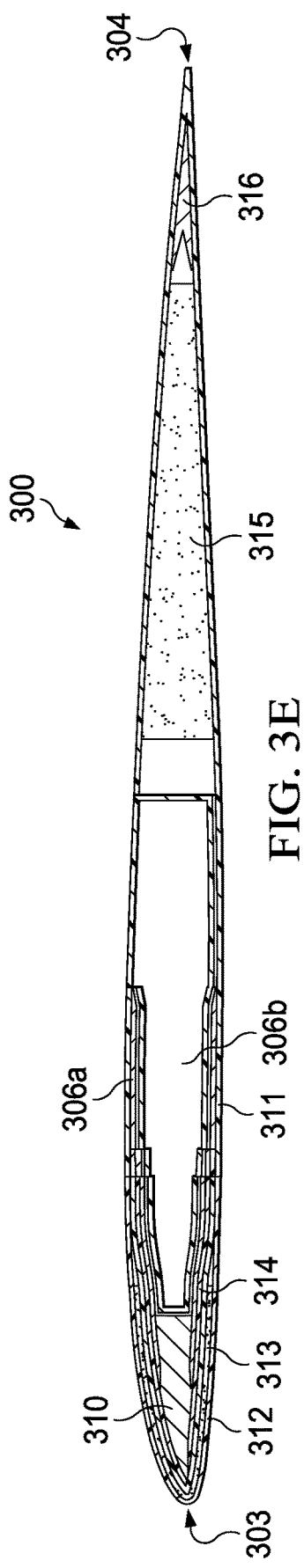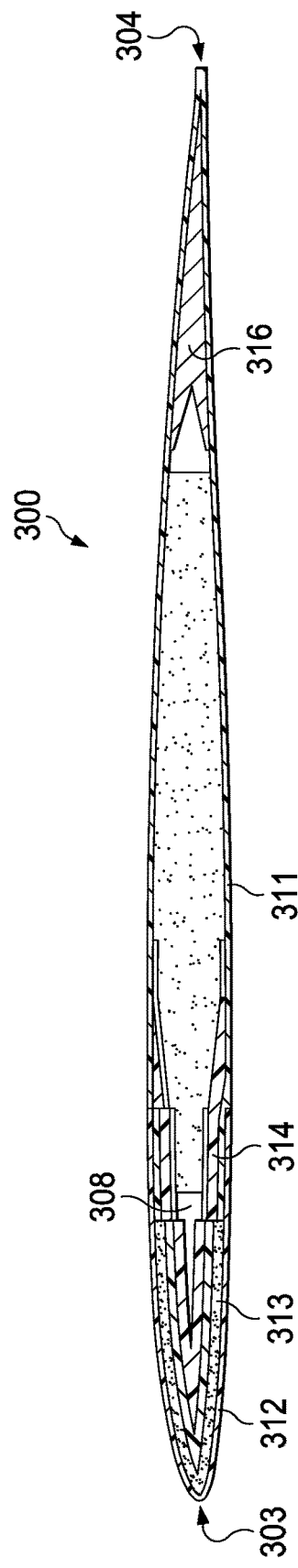

ADAPTABLE ROTOR BLADE DESIGN FOR PERFORMANCE FLEXIBILITY

TECHNICAL FIELD

This disclosure relates generally to rotorcraft design, and more particularly, though not exclusively, to an adaptable rotor blade design for performance flexibility.

BACKGROUND

A rotorcraft operates using a rotor with a plurality of rotating rotor blades. A rotor blade is typically designed and built to meet fixed performance targets for a particular production rotorcraft, such as targets for rotor inertia, blade vibration, and blade stability, among others. Moreover, once a rotor blade has been designed, it can be difficult to efficiently modify the blade design and/or performance, as the tooling and manufacturing process supports only that design. For example, redesigning any aspect of the rotor blade (e.g., adjusting the inertia, blade vibration, and/or blade stability) may require intrusive design and tooling modifications, which may be cost prohibitive and time consuming.

SUMMARY

According to one aspect of the present disclosure, a rotor blade may comprise a blade body, a spar structure, and a blade nose. The blade body may comprise a skin, wherein the skin is configured to form an airfoil shape, and wherein the airfoil shape comprises an inboard end, an outboard end, a leading edge, and a trailing edge. The spar structure may comprise a first spar cap and a second spar cap, wherein the first spar cap is coupled to an upper portion of the skin, and wherein the second spar cap is coupled to a lower portion of the skin. The blade nose may comprise a cavity, wherein the cavity is configured to house a plurality of modular weights at a plurality of radial blade locations, wherein the plurality of radial blade locations comprises a range of locations between the inboard end and the outboard end.

BRIEF DESCRIPTION OF THE DRAWINGS

FIGS. 3A-F illustrate various cross-section views of an adaptable rotor blade design.

DETAILED DESCRIPTION

Figure 1:
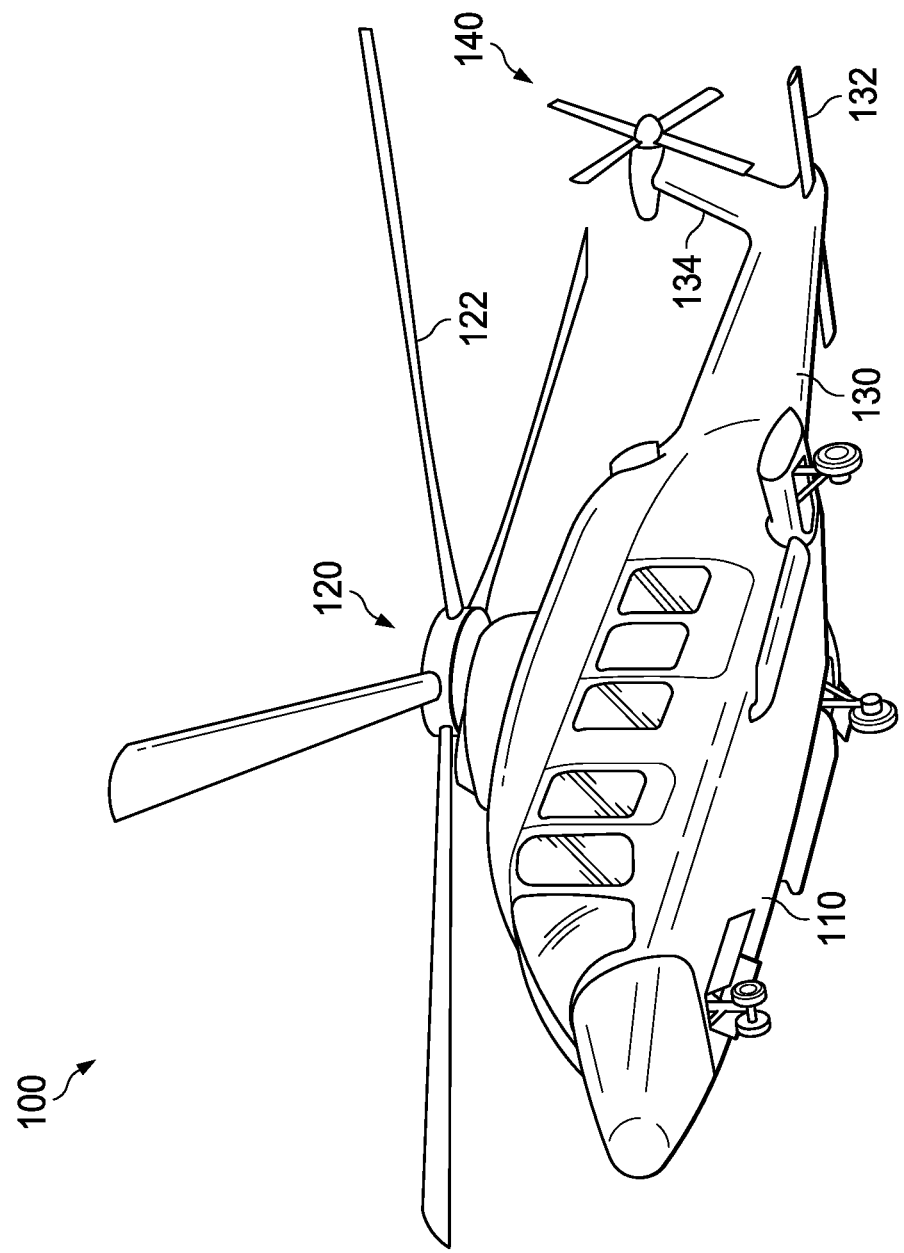
FIG. 1 illustrates an example rotorcraft in accordance with certain embodiments.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming, it would nevertheless be a routine undertaking for those of ordinary skill in the art having the benefit of this disclosure.

In the specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above," "below," "upper," "lower," or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction.

Further, the present disclosure may repeat reference numerals and/or letters in the various examples. This repetition is for the purpose of simplicity and clarity and does not in itself dictate a relationship between the various embodiments and/or configurations discussed.

Example embodiments that may be used to implement the features and functionality of this disclosure will now be described with more particular reference to the attached FIGURES.

FIG. 1 illustrates an example embodiment of a rotorcraft 100. Rotorcraft 100 includes a fuselage 110, a rotor system 120, and an empennage 130. The fuselage 110 is the main body of the rotorcraft, which may include a cabin for the crew, passengers, and/or cargo, and may also house certain mechanical and electrical components, such as the engine(s), transmission, and flight controls. The rotor system 120 is used to generate lift for the rotorcraft using a plurality of rotating rotor blades 122. For example, the engine(s) of the rotorcraft can be used to generate torque to cause the rotor blades 122 to rotate, which in turn generates lift. Moreover, the pitch of each rotor blade 122 can be adjusted in order to selectively control direction, thrust, and lift for the rotorcraft 100. The empennage 130 of the rotorcraft includes a horizontal fin 132, vertical fin 134, and tail rotor system 140. The horizontal fin 132 and vertical fin 134 may be respectively used for horizontal stability and vertical stability. Moreover, the tail rotor system 140 may be used to provide anti-torque and/or direction control.

The rotor blades 122 of the main rotor system 120 are typically designed for a particular rotorcraft based on numerous performance considerations, including aerodynamics (e.g., lift), vibration, weight and inertia, and so forth. For example, rotor blades 122 are typically designed with a fixed target blade weight, which results in a particular amount of inertia. Rotor inertia is a significant factor in the autorotation performance of a rotorcraft. Autorotation is a rotorcraft capability that allows the main rotor 120 to continue rotating after engine power is lost, for example, by relying on the inertia of the rotor and the aerodynamics during descent. Autorotation enables a rotorcraft to land safely in the event of an engine failure, which is a particularly important safety feature for single engine helicopters. In some cases, government regulations may require certain rotorcraft to include emergency autorotation capabilities.

Accordingly, autorotation performance depends significantly on the inertia of the rotor 120. For example, greater rotor inertia results in more energy in the rotor to cause autorotation for safely landing a rotorcraft. The inertia of the rotor is dictated by the weight of the rotor blades 122. For example, heavier rotor blades result in greater inertia, while lighter rotor blades result in less inertia. Heavier rotor blades, however, also increase the weight of the rotorcraft, which can negatively impact other performance considerations.

A rotor blade 122 is typically designed and built to meet specific performance targets for a particular production rotorcraft, such as targets for rotor inertia, blade vibration, and blade stability. In some cases, for example, the performance targets for inertia, vibration, and stability may be attained by embedding weights into the leading edge of the rotor blade 122 (e.g., lead, tuning, balance, inertial, ballast, and/or tungsten weights). Once a rotor blade has been designed, however, the tooling and manufacturing process supports only that design. Redesigning any aspect of the rotor blade 122 (e.g., adjusting the inertia using embedded weights) may require intrusive design and tooling modifications, which may be cost prohibitive and time consuming. Accordingly, existing rotor blade designs are typically designed for, and tailored to, a particular production aircraft and cannot be efficiently modified or adapted for other aircraft.

Accordingly, this disclosure describes various embodiments of an adaptable rotor blade design that can be adapted and/or tuned for different performance targets (e.g., to provide variable inertia, low vibration, and blade stability) without changing the tooling used to manufacture the blade. In this manner, the adaptable rotor blade design can be adapted and/or tuned for different aircraft while still being manufactured from within the same blade tooling.

Example embodiments of an adaptable rotor blade design are described below with more particular reference to the remaining FIGURES. Moreover, it should be appreciated that rotorcraft 100 of FIG. 1 is merely illustrative of a variety of aircraft that can be used with embodiments described throughout this disclosure. Other aircraft implementations can include, for example, fixed wing airplanes, hybrid aircraft, tiltrotor aircraft, unmanned aircraft, gyrocopters, a variety of helicopter configurations, and drones, among other examples.

Figure 2:
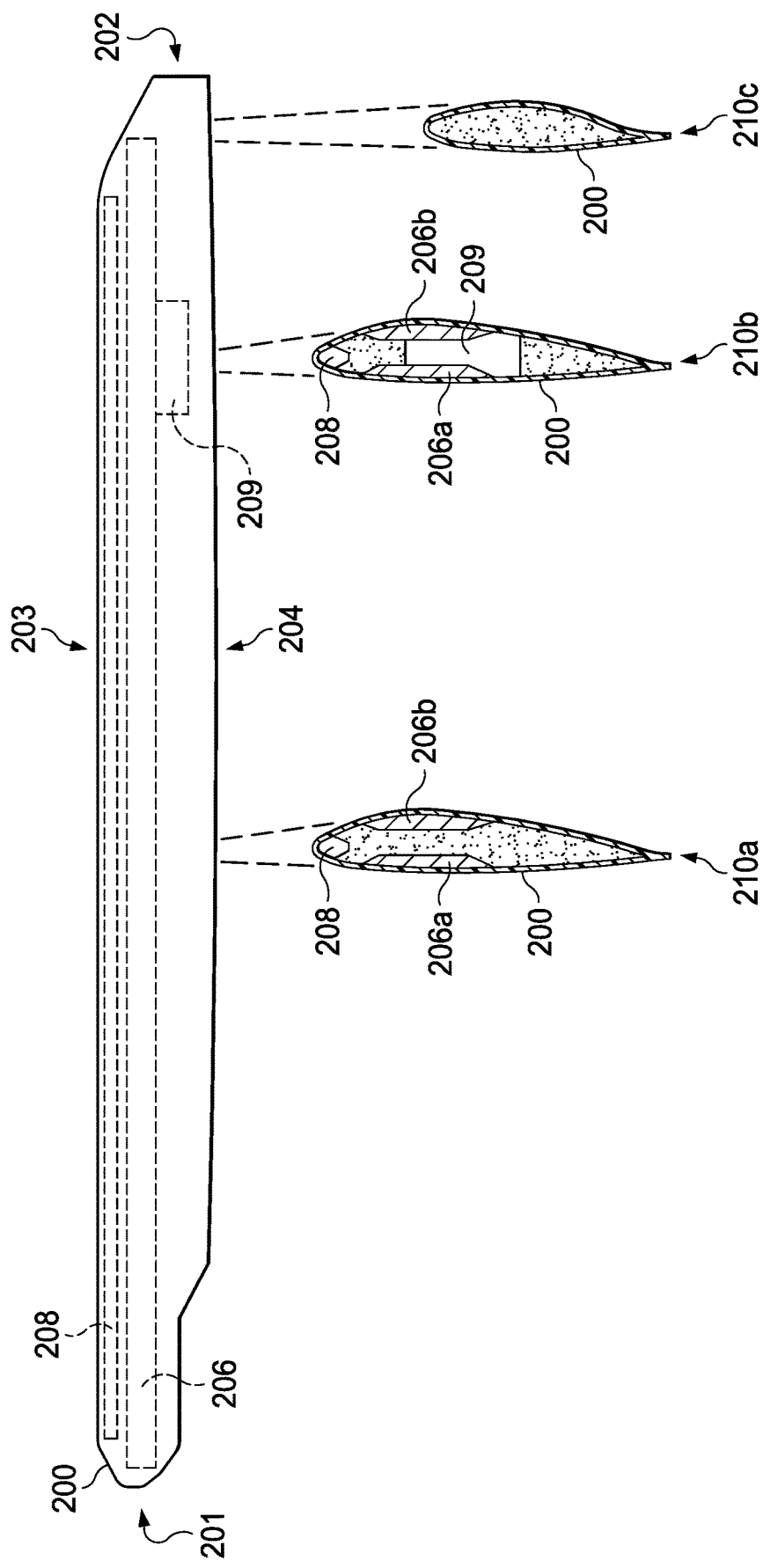
FIG. 2 illustrates an example embodiment of an adaptable rotor blade design for performance flexibility.

FIG. 2 illustrates an example embodiment of an adaptable rotor blade design for performance flexibility. The illustrated example depicts a rotor blade 200, along with various cross-section views 210*a-c* from different radial locations of rotor blade 200.

Rotor blade 200 is shown with an inboard end 201, outboard end 202, leading edge 203, and trailing edge 204. Moreover, in the illustrated embodiment, rotor blade 200 includes spar caps 206*a-b*, a hollow airfoil nose 208, and a weight pocket 209.

Rotor blade 200 uses a novel blade design that enables it to be adapted and/or tuned without changing the tooling used to manufacture the blade. For example, rotor blade 200 can be adapted to provide a variable amount of inertia, low vibration, and blade stability, as appropriate for a particular rotorcraft application. In this manner, rotor blade 200 can be adapted and/or tuned for different aircraft while still being manufactured using the same blade tooling. In some embodiments, for example, the maximum possible inertia range can be accommodated by starting with a lightweight basic blade design, and incorporating a mechanism for adding internal modular weights in a manner that does not require tooling changes. The modular weights, for example, may include any type of weight embedded within the leading edge 203 of rotor blade 200 for performance purposes, including lead, tuning, balance, inertial, ballast, and/or tungsten weights. Rotor blade 200 also includes a weight pocket 209 near the outboard end 202 of the blade (e.g., near the blade tip), which can be used for further tuning adjustments.

In some embodiments, for example, the body of rotor blade 200 may be formed using any suitable composite materials, such as a carbon and/or glass fiber skin and a large cell carbon core. Moreover, instead of a typical spar, rotor blade 200 may include two spar caps 206*a-b* of approximately constant size, which are respectively attached to the upper and lower skins of rotor blade 200. A spar, for example, is an internal structural component spanning through a rotor blade to provide strength and/or stiffness. Separating a spar into two upper and lower spar caps 206*a-b*, however, creates space for a hollow cavity in the airfoil nose 208 along the leading edge 203 of rotor blade 200. The hollow airfoil nose 208 can then be utilized in a modular approach, for example, by leveraging different radial locations of the hollow nose 208 for different purposes. For example, each radial location of the hollow nose 208 can be filled with modular performance weight (e.g., lead, tuning, balance, inertial, ballast, and/or tungsten weights), composite filler material (e.g., glass, carbon, or foam filler), and/or may remain unfilled. In this manner, modular performance weights can be embedded at desired radial locations of the hollow airfoil nose 208. Moreover, the modular weights can be tailored with different shapes and sizes for different radial locations in the hollow airfoil nose 208. Accordingly, particular radial locations of the hollow airfoil nose 208 can be filled with tailored modular weights in order to adjust various performance characteristics of rotor blade 200, such as rotor inertia, blade vibration, and blade stability. In this manner, rotor blade 200 can be adapted to provide the desired performance characteristics without changing the tooling used to manufacture the blade.

This adaptable blade design 200 can be achieved, for example, by separating the spar into two spar caps 206*a-b* that are respectively attached to the upper and lower skins of rotor blade 200. Forming the spar in this manner frees up volume within the nose of rotor blade 200 that would otherwise be occupied by a typical spar (e.g., as shown and described in connection with FIG. 4). This freed space forms a hollow airfoil nose 208 along the leading edge 203 of rotor blade 200. The remaining volume of the internal core of rotor blade 200 can be filled with any suitable core material, such as large cell carbon core, nomex, or roacell.

Moreover, the hollow airfoil nose 208 can be utilized in a modular approach where each section is either filled with modular performance weight, filled with composite filler, and/or left unfilled, depending on the partial radial location within the hollow airfoil nose 208. In this manner, modular weights can be added to appropriate radial locations of the hollow airfoil nose 208 in order to achieve the desired performance characteristics (e.g., rotor inertia, blade vibration, and/or blade stability). Moreover, the distribution of modular weights within the hollow airfoil nose 208 can be varied for different aircraft applications in order to optimize the performance for each application.

The embodiments of an adaptable rotor blade described throughout this disclosure provide numerous technical advantages, including, for example, performance flexibility, simplicity in design and manufacturing, reduced cost, and reduced weight (e.g., by allowing optimal placement of the modular weights), among other benefits. This adaptable rotor blade design includes numerous novel and unique aspects, including an interior blade construction that is designed to enable blade performance optimizations, such as variable rotor inertia, low blade vibration, and blade stability. For example, spar material is separated onto the upper and lower skins, thus making room available in the blade nose for modular weights that can be used for increasing rotor inertia, reducing blade vibration, and providing blade stability. This adaptable rotor blade design is easily scalable to multiple gross weight and size blade designs. The performance of the blade can be adapted even after it has been designed and the manufacturing tooling has been built, thus avoiding intrusive design and tooling modifications that are cost prohibitive and time consuming. For example, both low inertia and high inertia rotors with low vibration may be manufactured from within the same outer mold line (OML) blade tooling.

FIGS. 3A-F illustrate various cross-section views of an adaptable rotor blade design 300. These figures illustrate cross-section views at different stations of rotor blade 300 (e.g., different radial locations along the span of rotor blade 300). For example, each station corresponds to a particular radial location along the span of rotor blade 300, and is identified using a station number that corresponds to a distance (e.g., number of inches) from the root of the blade towards the blade tip (e.g., from the inboard end of the blade towards the outboard end). In particular, FIGS. 3A, 3B, 3C, 3D, 3E, and 3F illustrate cross-section views at stations 90, 90.01, 139, 177, 205, and 222, respectively.

Rotor blade 300 includes an outer skin 311 that forms an aerodynamic airfoil shape with a leading edge 303 and a trailing edge 304. An abrasion strip 312 is used to protect the leading edge 303 of the rotor blade 300 from harmful particles during operation, and thus the abrasion strip 312 covers the skin 311 around the leading edge 303 and then tapers off. Rotor blade 300 also includes upper and lower spar caps 306a-b to provide structural strength and stiffness. Moreover, a torque clip 313 and torque wrap 314 are used to bind the spar caps 306 together and to the outer skin 311, thus aiding in the closure of the torque box and providing a continuous torque path for torsional stiffness. The remaining volume in the body of the rotor blade 300 may be filled with any suitable filler material 315, such as foam filler, large cell carbon core, nomex, and/or roacell, among other examples.

In some embodiments, the spar caps 306a-b may formed using a build-up of discrete plies (e.g., layered composite plies), resulting in a varying number of plies at different radial locations. The plies, for example, may be uni-directional composite material that can be used to carry centrifugal forces from the outboard end (e.g., the blade tips) to the inboard end. In some embodiments, the spar caps 306a-b may include between one and four plies of material, depending on the particular radial location. In other embodiments, however, the spar caps 306a-b may be formed using any number of plies. This thick fabric lay-up can be used to form upper and lower spar caps 306a-b of roughly equal cross-sectional area that tapers with radius. Fabric thickness can be driven by radial stress and blade frequency tuning requirements. This spar cap design opens up the volume under the leading edge of the blade (e.g., in the blade nose), which is better optimized for ballast weights used for inertia, frequency tuning for lower vibration, and blade stability.

The design of rotor blade 300 enables the blade performance to be optimized for a particular aircraft application without changing the tooling used to manufacture the blade. For example, the blade performance can be optimized to provide variable rotor inertia, low blade vibration, and blade stability, as appropriate for a particular rotorcraft application. In the illustrated embodiment, this performance flexibility is achieved using a rotor blade design 300 with separate upper and lower spar caps 306a-b rather than a single or contiguous spar structure. Incorporating separate spar caps 306a-b into the upper and lower blade surfaces accommodates additional volume in the blade nose 308 that can be embedded with modular weights 310 to optimize the blade performance. In particular, this spar cap design frees up volume within the blade nose 308 that would otherwise be occupied by a typical spar (e.g., as shown and described in connection with FIG. 4). The freed space creates a hollow airfoil nose 308 along the leading edge 303 of rotor blade 300. The hollow airfoil nose 308 allows modular weights 310 to be incorporated into the blade using a modular approach, for example, by embedding modular weights 310 at desired radial locations along the span of rotor blade 300. This modular approach enables the modular weights 310 to be tailored with different shapes and sizes at different radial locations along the blade 300. Accordingly, select radial locations of the hollow airfoil nose 308 can be filled with tailored modular weights 310 in order to adjust various performance characteristics of rotor blade 300, such as rotor inertia, blade vibration, and blade stability. In some embodiments, for example, the modular weights 310 could be added to a compression molded fiberglass section that fits into the blade 300 without modification to the existing blade tooling. In this manner, rotor blade 300 can be adapted to provide desired performance characteristics without changing the tooling used to manufacture the blade.

In some embodiments, for example, flapwise frequency tuning for low vibration can be achieved by optimal placement of the modular weights 310, and/or by adjusting the thickness of the upper and lower spar caps 306a-b. Chordwise frequency tuning for low vibration can be achieved by adding a leading edge clip 313 and/or trailing edge wedge 316 to aid in the closure of the torque box, which may also facilitate ease of manufacturing. Blade chord balance and inertia can be achieved by placing lead or other ballast weight near the blade tip (e.g., in the hollow nose 308 or in the weight pocket 309). Additional ballast weight can be added inboard to help compensate for the aft chordwise center of gravity shift due to the spar caps 306a-b being placed further aft chordwise. Moreover, in some embodiments, torsional frequency tuning may be achieved by integrating a large cell carbon core into the rotor blade design 300 instead of a foam core. A large cell carbon core and carbon skin fabric, for example, may be used to provide torsion stiffness.

The cross-section views illustrated by FIGS. 3A-F are views at different stations of rotor blade 300 (e.g., different radial locations along the span of rotor blade 300). As shown in these figures, rotor blade 300 includes upper and lower spar caps 306a-b, and an airfoil nose that is hollow 308 and/or embedded with a modular weight 310 depending on the radial location. For example, FIG. 3A shows that the nose is hollow 308 at station 90 of rotor blade 300. FIG. 3B shows that the nose is primarily embedded with a modular weight 310 at station 90.01 of rotor blade 300. FIG. 3C shows that the nose is hollow 308 at station 139 of rotor blade 300. FIG. 3D shows that the nose is partially hollow 308 and partially embedded with a modular weight 310 at station 177 of rotor blade 300. FIG. 3E shows that the nose is embedded with a modular weight 310 at station 205 of rotor blade 300, and also shows that a weight pocket 309 is included at that station of the blade. Finally, FIG. 3F shows that a small portion of the nose is hollow 308 at station 222 of rotor blade 300, which is near the outboard end of the blade.

Figure 4:
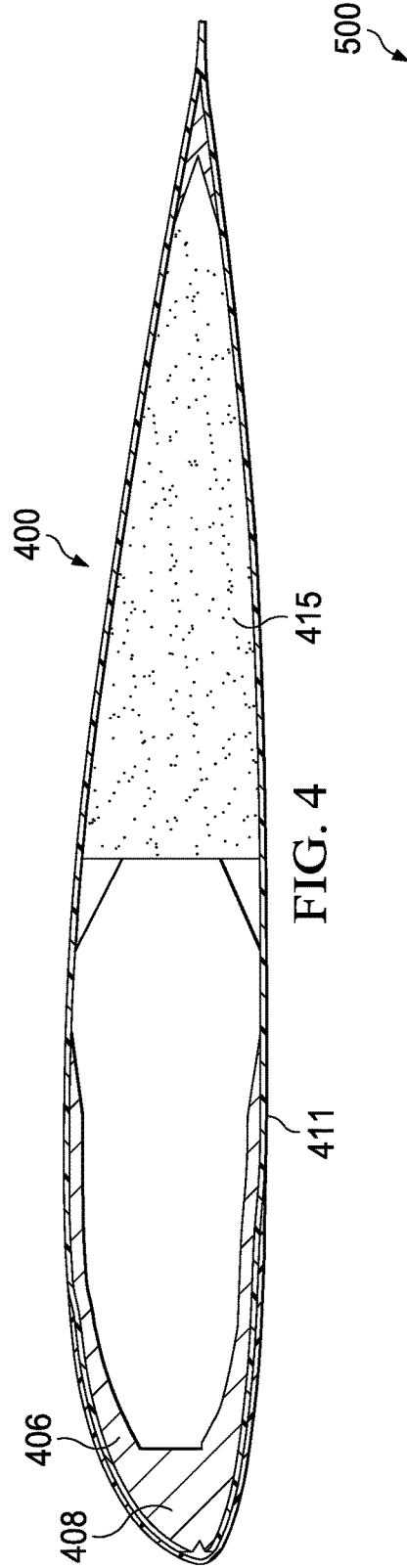
FIG. 4 illustrates a cross-section view of an alternative rotor blade design.

FIG. 4 illustrates a cross-section view of an alternative rotor blade design 400. The illustrated rotor blade design 400 includes an outer skin 411, a spar 406, and filler material 415. Moreover, the spar 406 is a contiguous structure that extends into the nose 408 of the blade. A drawback of this design, however, is that the spar material 406 in the blade nose 408 renders it challenging to embed adequate weights in the nose of the blade (e.g., to provide adequate chord balance for rotor blade flutter and divergence stability, blade tuning for low vibration, and/or additional mass for increased rotor inertia). By contrast, the rotor blade design from FIGS. 2 and 3 includes a hollow nose that allows modular weights to be embedded using a modular approach, which can be tailored for different rotorcraft applications without modification to the existing blade tooling and manufacturing.

For example, the illustrated rotor blade design 400 typically involves either polar winding or fiber placement manufacturing methods. In both cases, uni-directional composite spar material is placed into the forward nose of the blade to carry centrifugal forces from the blade tips inward to the blade retention bolts. In addition, polar winding requires constant uni-directional material volume with span to avoid cutting fibers. However, given that centrifugal force stress reduces with blade radius, this design results in wasted volume in the blade nose for excess spar material that is not needed to accommodate stress, due to the lower centrifugal and bending loads near the blade tip. Moreover, the excess spar material in the blade nose hinders the ability to embed weights into the nose, as the weights must be embedded directly into the spar material. Accordingly, this design can only accommodate fixed performance characteristics (e.g., fixed rotor inertia), as defined by the placement of weights into the spar material. Any adjustments or optimizations would require changes to the blade design, along with new tooling and manufacturing.

Figure 5:
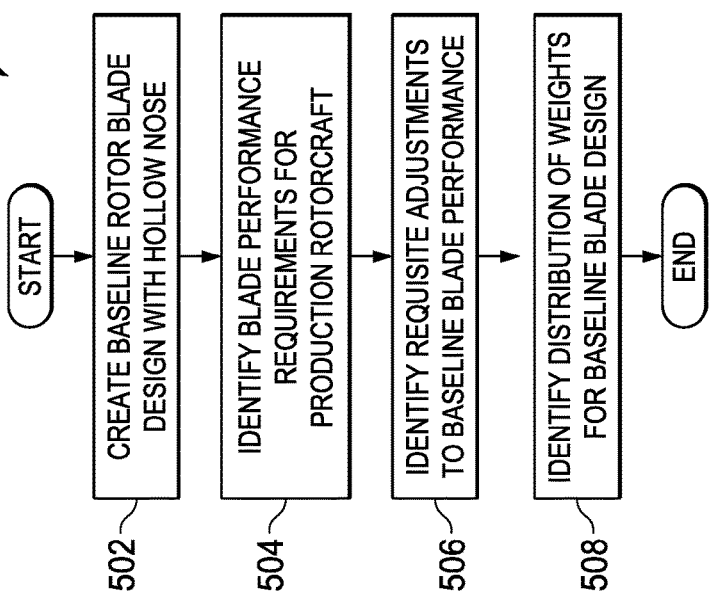
FIG. 5 illustrates a flowchart for optimizing the performance of an adaptable rotor blade.

FIG. 5 illustrates a flowchart 500 for optimizing the performance of an adaptable rotor blade. Flowchart 500 may be implemented, in some embodiments, using the adaptable rotor blade embodiments described throughout this disclosure.

The flowchart may begin at block 502 by creating a baseline rotor blade design with a hollow nose. This baseline blade design can be achieved, for example, by separating the spar into two spar caps that are respectively attached to the upper and lower skins of the rotor blade. Forming the spar in this manner frees up volume within the nose of the rotor blade that would otherwise be occupied by a typical spar structure. This freed space forms a hollow airfoil nose along the leading edge of the rotor blade. The baseline blade design can include any suitable core material to fill the remaining volume of the internal core of the blade, such as a large cell carbon core, nomex, or roacell.

The flowchart may then proceed to block 504 to identify the blade performance requirements for a particular production rotorcraft. For example, a rotor blade is typically designed and built to meet specific performance targets for a particular production rotorcraft, such as targets for rotor inertia, blade vibration, and blade stability.

The flowchart may then proceed to block 506 to identify the requisite adjustments to the performance of the baseline blade design. For example, the baseline blade design may provide a baseline level of performance that needs to be adjusted in order to meet the blade performance requirements for a particular production rotorcraft (e.g., rotor inertia, blade vibration, blade stability, and so forth).

The flowchart may then proceed to block 508 to identify the distribution of weights for the baseline blade design. In some cases, for example, the blade performance targets (e.g., rotor inertia, blade vibration, and blade stability) may be attained by embedding modular weights into the leading edge of the rotor blade. The modular weights, for example, may include any type of weight embedded within the leading edge of the rotor blade for performance purposes, including lead, tuning, balance, inertial, ballast, and/or tungsten weights, among other examples. Accordingly, the hollow airfoil nose of the baseline blade design can be utilized in a modular approach by filling each portion with either foam, modular weight, or nothing, depending on the radial location. For example, modular weights can be added to appropriate radial locations of the hollow airfoil nose in order to achieve the desired performance characteristics (e.g., rotor inertia, blade vibration, and/or blade stability). In this manner, the distribution of modular weights within the hollow airfoil nose can be varied for different aircraft applications in order to optimize the performance for each application.

Accordingly, this adaptable rotor blade design can be adapted and/or tuned for different performance targets (e.g., to provide variable inertia, low vibration, and blade stability) without changing the tooling used to manufacture the blade. In this manner, the adaptable rotor blade design can be adapted and/or tuned for different aircraft while still being manufactured from within the same blade tooling.

At this point, the flowchart may be complete. In some embodiments, however, the flowchart may restart and/or certain blocks may be repeated.

The flowcharts and diagrams in the FIGURES illustrate the architecture, functionality, and operation of possible implementations of various embodiments of the present disclosure. It should also be noted that, in some alternative implementations, the function(s) associated with a particular block may occur out of the order specified in the FIGURES. For example, two blocks shown in succession may, in fact, be executed substantially concurrently, or the blocks may sometimes be executed in the reverse order or alternative orders, depending upon the functionality involved.

Although several embodiments have been illustrated and described in detail, numerous other changes, substitutions, variations, alterations, and/or modifications are possible without departing from the spirit and scope of the present invention, as defined by the appended claims. The particular embodiments described herein are illustrative only, and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

In order to assist the United States Patent and Trademark Office (USPTO), and any readers of any patent issued on this application, in interpreting the claims appended hereto, it is noted that: (a) Applicant does not intend any of the appended claims to invoke paragraph (f) of 35 U.S.C. § 112, as it exists on the date of the filing hereof, unless the words "means for" or "steps for" are explicitly used in the particular claims; and (b) Applicant does not intend, by any statement in the specification, to limit this disclosure in any way that is not otherwise expressly reflected in the appended claims.

What is claimed is:

1. A rotor blade comprising:
a blade body comprising a skin, wherein the skin is configured to form an airfoil shape, and wherein the airfoil shape comprises an inboard end, an outboard end, a leading edge, and a trailing edge;
a spar structure comprising a first spar cap and a second spar cap, wherein the first spar cap is coupled to an upper portion of the skin, and wherein the second spar cap is coupled to a lower portion of the skin, the first spar cap and the second spar cap together defining a hollow blade nose including a cavity along the leading edge, the hollow blade nose configured for receiving a plurality of removable modular weights at a plurality of radial blade locations between the inboard end and the outboard end, wherein a distribution of the plurality of removable modular weights in the cavity of the blade nose is configured to optimize blade performance; and
a clip configured to couple the first spar cap and the second spar cap; and
wherein the first spar cap and the second spar cap are separate structural components that are stationary and together form a non-contiguous spar structure.

2. The rotor blade of claim 1, wherein the plurality of removable modular weights is distributed at first and second radial blade locations in the cavity of the blade nose.

3. The rotor blade of claim 1, wherein the distribution of the plurality of removable modular weights in the cavity of the blade nose is configured to increase rotor inertia.

4. The rotor blade of claim 1, wherein the distribution of the plurality of removable modular weights in the cavity of the blade nose is configured to reduce blade vibration.

5. The rotor blade of claim 1, wherein the distribution of the plurality of removable modular weights in the cavity of the blade nose is configured to increase blade stability.

6. The rotor blade of claim 1, wherein the plurality of removable modular weights varies in shape and size.

7. The rotor blade of claim 1, further comprising a compression molded fiberglass structure, wherein the compression molded fiberglass structure comprises the plurality of removable modular weights, and wherein the compression molded fiberglass structure is housed in the cavity of the blade nose.

8. The rotor blade of claim 1, further comprising a weight pocket housed in the blade body, wherein the weight pocket is located near the outboard end.

9. The rotor blade of claim 1, wherein the first spar cap and the second spar cap each comprise a plurality of layered composite plies, wherein the plurality of layered composite plies comprises a varying number of plies at different radial blade locations.

10. The rotor blade of claim 1, wherein the skin comprises a carbon fiber skin, and wherein the blade body comprises a large cell carbon core.

11. A rotorcraft comprising:
a fuselage; and
a rotor comprising a plurality of rotor blades, wherein at least one rotor blade of the plurality of rotor blades comprises:
a blade body comprising a skin, wherein the skin is configured to form an airfoil shape, and wherein the airfoil shape comprises an inboard end, an outboard end, a leading edge, and a trailing edge; and
a spar structure comprising a first spar cap and a second spar cap, wherein the first spar cap is coupled to an upper portion of the skin, and wherein the second spar cap is coupled to a lower portion of the skin, the first spar cap and the second spar cap together defining a hollow blade nose including a cavity along the leading edge, the hollow blade nose configured for receiving a plurality of removable modular weights at a plurality of radial blade locations between the inboard end and the outboard end, wherein a distribution of the plurality of removable modular weights in the cavity of the blade nose is configured to optimize blade performance; and
a clip configured to couple the first spar cap and the second spar cap; and
wherein the first spar cap and the second spar cap are separate structural components that are stationary and together form a non-contiguous spar structure not contiguous.

12. The rotorcraft of claim 11, wherein the distribution of the plurality of removable modular weights in the cavity of the blade nose is configured to increase rotor inertia.

13. The rotorcraft of claim 11, wherein the distribution of the plurality of removable modular weights in the cavity of the blade nose is configured to reduce blade vibration.

14. The rotorcraft of claim 11, wherein the distribution of the plurality of removable modular weights in the cavity of the blade nose is configured to increase blade stability.

15. The rotorcraft of claim 11, wherein the at least one rotor blade further comprises a compression molded fiberglass structure, wherein the compression molded fiberglass structure comprises the plurality of removable modular weights, and wherein the compression molded fiberglass structure is housed in the cavity of the blade nose.

* * * * *